United States Patent
Upadhyaya

(10) Patent No.: US 10,833,577 B2
(45) Date of Patent: Nov. 10, 2020

(54) OR-FET BODY BRAKE IN PHASE REDUNDANT SCHEME

(71) Applicant: Alpha and Omega Semiconductor (Cayman) Ltd., Grand Cayman (KY)

(72) Inventor: Prabal Upadhyaya, San Jose, CA (US)

(73) Assignee: Alpha and Omega Semiconductor (Cayman) Ltd., Grand Cayman (KY)

( * ) Notice: Subject to any disclaimer, the term of this patent is extended or adjusted under 35 U.S.C. 154(b) by 0 days.

(21) Appl. No.: 16/368,731

(22) Filed: Mar. 28, 2019

(65) Prior Publication Data
US 2020/0313542 A1   Oct. 1, 2020

(51) Int. Cl.
*H02M 1/00* (2006.01)
*H02M 1/16* (2006.01)
*H02M 3/158* (2006.01)
*H02M 3/157* (2006.01)

(52) U.S. Cl.
CPC .............. *H02M 1/16* (2013.01); *H02M 3/157* (2013.01); *H02M 3/1584* (2013.01)

(58) Field of Classification Search
CPC ...... H02M 1/16; H02M 3/1584; H02M 3/157; H02M 3/158
See application file for complete search history.

(56) References Cited

U.S. PATENT DOCUMENTS 6,031,743 A * 2/2000 Carpenter ............. H02M 3/158
363/65

2005/0184713 A1 * 8/2005 Xu ..................... H02M 3/156
323/282
2017/0302172 A1 * 10/2017 Peretz ................. H02M 3/156

OTHER PUBLICATIONS

Amir Babazadeh et al., "Hybrid Digital Adaptive Control for Fast Transient Response in Synchronous Buck DC-DC Converters" in IEEE Transactions on Power Electronics, vol. 24, No. 11, Nov. 2009 pp. 2625=2638.
Marian K. Kazimierczuk, "Pulse-Width Modulated DC-DC Power Converters", Chapter 2, "Buck PWM DC-DC Converter", pp. 22-89, 2nd Edition, Wiley, 2015.
Robert W. Erickson, "DC-DC Power Converters", Article in Wiley Encyclopedia of Electrical and Electronics Engineering, Mar. 1999, John Wiley & Sons, Inc., New York, NY.
Taylor Craig Yeago, Master's Thesis, A Two-Phase Buck Converter With Optimum Phase Selection for Low Power Applications, the Virginia Polytechnic Institute and State University, Blacksburg, VA, Dec. 10, 2014.
Vahid Yousefzadeh, et a., "Proximate Time-Optimal Digital Control for Synchronous Buck DC-DC Converters" in IEEE Transactions on Power Electronics, vol. 23, No. 4, Jul. 2008, pp. 2018-2026.

* cited by examiner

*Primary Examiner* — Adolf D Berhane
*Assistant Examiner* — Afework S Demisse
(74) *Attorney, Agent, or Firm* — JDI Patent; Joshua D. Isenberg; Robert Pullman

(57) ABSTRACT

A method, system and computer program product for improving inductor current ramp down times in a DC-to-DC converter having an inductor conductively coupled to a low side transistor on a first side and an or-ing transistor coupled to a second side, where the DC-to-DC converter is in a phase redundant power supply. The method comprises turning off the low side transistor and turning off the or-ing transistor in response to an unloading transient.

19 Claims, 2 Drawing Sheets

OR-FET BODY BRAKE IN PHASE REDUNDANT SCHEME

FIELD OF THE INVENTION

Aspects of the present disclosure generally relate to power converters and more particularly to DC-to-DC power converters arranged in a phase redundant scheme.

BACKGROUND OF THE INVENTION

Modern load (Servers, GPU, ASIC, Network switches and other high current loads) hosts demand, small, reliable and cost effective server systems. A major source of failure for server systems is the power supply. A Phase redundant power supply scheme is used in many modern servers to improve reliability. A Phase redundant power supply scheme generally has multiple redundant power stages. Phase redundant power supplies are able to detect if a power stage has failed and be able to isolate the failed power stage for rest of the system to operate uninterrupted. Popular Phase redundant power supplies have N+2 power stages where N is the number of phases. For a phase redundant power supply with N+2 power stages, 2 power stages could fail and the power supply could still operate normally.

To implement phase redundant power supply schemes multiple power stages are arranged together such that if one fails it can be removed from the power circuit and remaining power stages can share the load. Thus power stages in phase redundant power supplies generally have at least one additional transistor compared to, non-redundant power supplies, used to switch out the power converter when it fails.

Another major issue for servers is transient performance. Specifically there is a need for power supplies with the ability to quickly ramp-down current in response to a unloading transient event.

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

System

Figure 1:
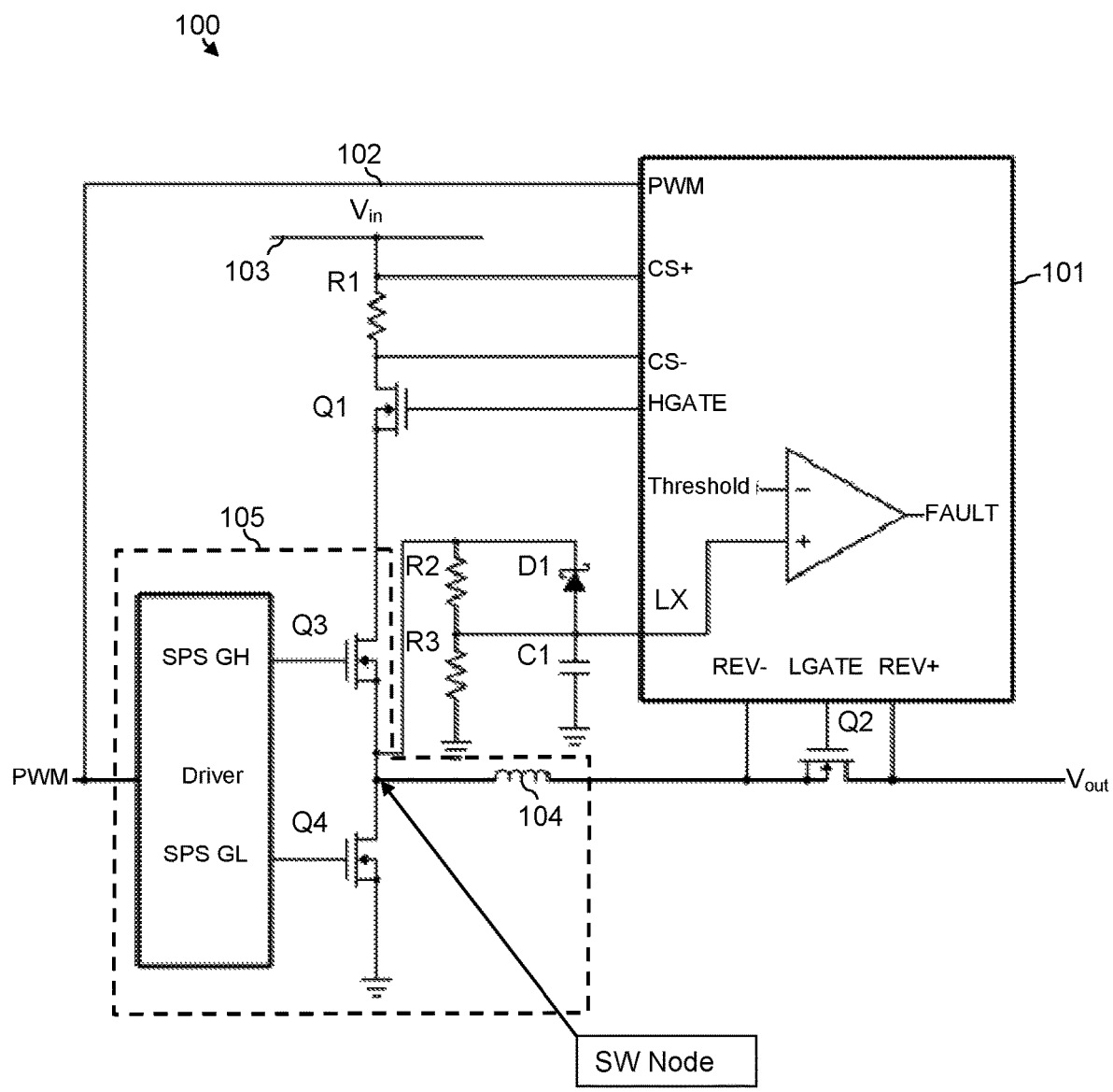
FIG. 1 is a circuit diagram of DC-to-DC power converter in a phase redundant power supply according to an embodiment of the present invention.

According to aspects of the present disclosure, the output voltage overshoot during unloading transient of a power converter in a phase redundant power supply may be suppressed by turning off an OR-ing transistor during a transient. FIG. 1 depicts a circuit diagram of a DC-to-DC converter 100 in a phase redundant power supply configured to suppress output voltage overshoot according to aspects of the present disclosure. Here, the DC-to-DC converter is part of a phase redundant power supply. As part of a phase redundant power supply the DC-to-DC converter has several components that allow the DC-to-DC converter to be removed from the power circuit in the event of a failure, these components are a high side cut off transistor Q1, a OR-ing transistor Q2 and a Phase Redundant Controller 101. The DC-to-DC converter also comprises active and passive power components configured to regulate output voltage ($V_{out}$) and monitor load current. These active power components are the High side transistor Q3, Low side Transistor Q4, Inductor 104, and capacitor (not shown). Additional voltage monitoring and control units such as a Proportional-integral-derivative controller (PID) and a Pulse Width Modulated signal controllers (PWM) are not shown but are at least communicatively coupled and conductively coupled respectively through the PWM lead 102.

The DC-to-DC converter in the phase redundant power supply receives electricity from a voltage supply 103 at a line voltage ($V_{in}$). By way of example, and not by way of limitation, the voltage supply 103 may provide a 12-volt line voltage. However, a person of ordinary skill in the art would know that the supply could be any voltage and may be any type of voltage supply used in the art. Current from the power supply 103 through a resistor R1 resulting in a voltage drop. The Phase redundant controller 101 monitors the voltage drop across resistor R1 via current sense leads CS+ and CS−. In the event of a failure detected through CS+ and CS− the Phase redundant controller 101 may send a signal configured to turn off the High side cut off transistor Q1 and the OR-ing transistor Q2 to protect the load from the failures and allow the Phase redundant power supply to continue operation with little to no down time. According to aspects of the present disclosure, the Phase redundant controller may receive signals from a PWM lead 102 through PWM. PWM signals may cause the PRC to turn off the OR-ing transistor Q2 in response to unloading transient. Additionally, the Phase redundant controller may monitor a reverse current through the OR-ing gate with leads Rev+ and Rev−. The controller 101 may send signals configured to control the gate of the OR-ing transistor Q2 through LGATE to take the DC-to-DC converter off the circuit in the event of a Q4 FET failure. In the event of Q1 transistor failure, SW node will be equivalent to $V_{IN}$. With the combination of R2, R3 and C1, LX node will monitor a voltage rise with a time constant of (R2∥R3)*C1. When LX rise crosses the internal fault threshold, comparator in PRC declares Q1 transistor failure and issues a fault to cut-off Q1 and Q2.

In some embodiments, PRC may be implemented in hardware with sufficient circuitry to carry out switching of the OR-ing transistor in response to an unloading transient. In other embodiments the PRC may be implemented as part of an integrated circuit, chip.

When the high-side cutoff transistor Q1 is in the 'ON' state, the electricity passes through the high side gate transistor and enters the Smart power stage 105. The high side transistor Q3 is switched to the 'ON' state to energize the inductor 104 according to the requirements of the load as determined by the PWM controller. When the OR-ing gate Q2 is in the 'ON' state energy passes through the high side transistor Q3, the Inductor 104 and the OR-ing gate Q2 before leaving the DC-to-DC converter through $V_{out}$. Additionally after the OR-ing transistor, Q2 there may be a capacitor (not shown). The current through the inductor builds a magnetic field in the inductor, which resists a change current. When the desired voltage level to $V_{out}$ has been achieved, the high side transistor Q3 is turned off and the Low side transistor Q4 is turned on. The magnetic field in the inductor begins to collapse causing current to flow through the circuit to $V_{out}$. When the voltage drops below a required level the high side transistor Q3 is turned on and the low side transistor Q4 may be turned off.

Load current demand varies depending upon state of operation. When the load enters a light-load condition, the current demand will be lower. During an unloading transient, a need to quickly discharge the energy stored as a magnetic field in the inductor 104 arises to avoid an output voltage overshoot. In prior methods, the inductor would simply be discharged by turning off the high side transistor Q3 and turning on low side transistor Q4. However, this often results in non-optimal discharge times. According to aspects of the present disclosure, the optimal discharge time can be achieved by turning off the high side transistor Q3, the low side transistor Q4 and the OR-ing transistor Q2 in response to an unloading transient. Turning off the high side transistor Q3, low side transistor Q4 and OR-ing transistor Q2 allows the energy from the inductor 104 to be quickly dumped through the body diodes of the low side transistor Q4 and OR-ing transistor Q2. This operation may be referred to as body braking.

Operation

Figure 2:
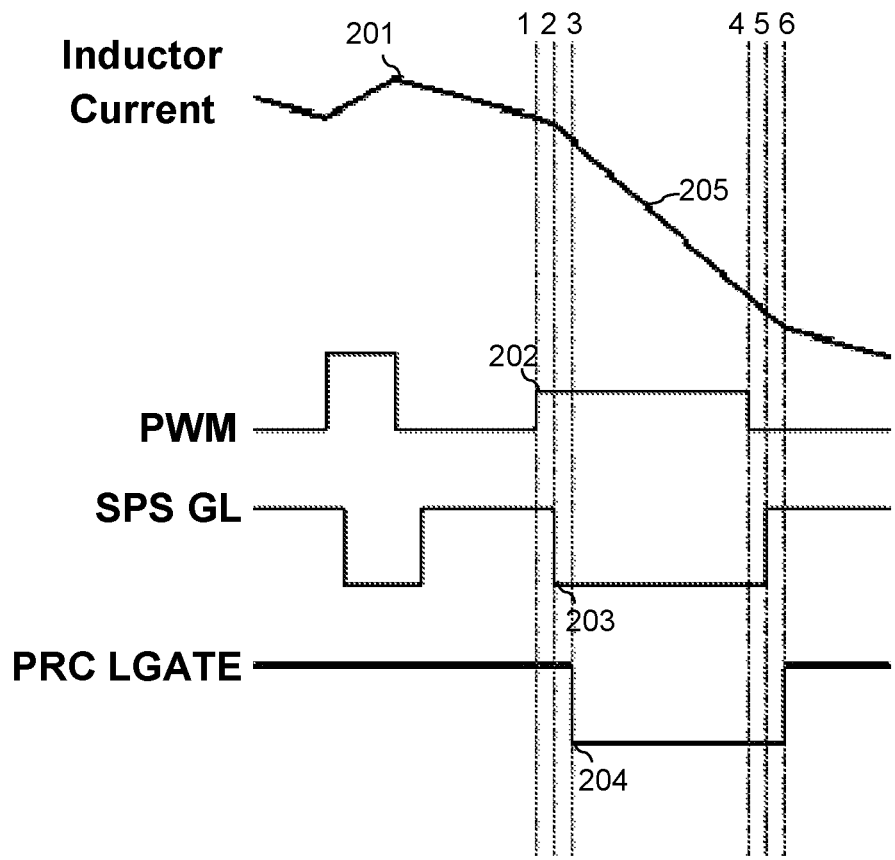
FIG. 2 is a set of line graphs showing inductor current, Pulse Width Modulation (PWM) signal, Smart Power Stage (SPS), Gate Low (GL) driver signal, and a signal from a Phase Redundant controller (PRC) Low Gate (LGATE) versus time showing operation of a DC-to-DC converter according to aspects of the present disclosure.

The line graphs shown in FIG. 2 illustrate operation of a DC-to-DC power supply with OR-ing transistor body brake according to aspects of the present disclosure. The top line in FIG. 2 depicts the behavior of inductor current over time. During normal operation, the current through the inductor may fluctuate 201 to maintain a desired voltage output level. An unloading transient condition 1 may be detected by a PWM controller, which may command the PWM to enter the tri-state 202 as seen in the second line from the top in FIG. 2. The driver in the smart power stage (SPS) responds to the PWM signal 2 by pulling GL low 203 as depicted in the third line from the top in FIG. 2. This sets the low side transistor to the 'OFF' state. The PWM signal is also received by the Phase redundant controller (PRC), when a tri-state PWM signal is received 3 the PRC pulls the LGATE signal low 204, switching the OR-ing transistor to the 'OFF' state shown in the fourth line from the top in FIG. 2. It should be noted that, while the third and fourth lines from the top in FIG. 2 depict the driver pulling GL low before the PRC pulls LGATE low this disclosure is not so limited, the GL may be pulled low and LGATE may be pulled low simultaneously or GL may be pulled low after LGATE is pulled low. In any case, both GL and LGATE are pulled low and the low side transistor and OR-ing transistor are switched to the 'OFF' state soon after detection of an unloading transient. With both the low side transistor and OR-ing transistor in the 'OFF' state the inductor current quickly drops 205 to the desired level which may be referred to as inductor ramp down. According to aspects of the present disclosure, the low side transistor Q4 and OR-ing transistor Q2 may be turned off within 30 nanoseconds (ns) of detection of the unloading transient.

After the inductor current has reached the desired level, the PWM controller causes the PWM to leave the tri-state 4 and send a low signal. According to aspects of the present disclosure the ramp down time may be less than 2.4 microsecond (µs). The low PWM signal is received by the driver at the SPS which pushes the GL signal high 5 turning the low side transistor to the 'ON' state. The PWM low signal is also received by the PRC which sends a high signal 6 to the LGATE causing the OR-ing transistor to switch to the 'ON' state.

It should be noted that, a conductive coupling may be any surface that provides an electrically conductive connection between the parts. For example, a conductive coupling may be a wire, a conductive trace on a surface, a conductive rail, or some other type conductive connection between the two objects being coupled. Similarly, a communicative coupling may be any connection that conveys information between the components being coupled. A component may be communicatively coupled with another component even when a third component acts on the information as long as the information being conveyed results in substantially the same desired result.

In accordance with aspects of the present disclosure, the components, process steps, and/or data structures may be implemented using various types of operating systems; computing platforms; user interfaces/displays, including personal or laptop computers, video game consoles, PDAs and other handheld devices, such as cellular telephones, tablet computers, portable gaming devices; and/or general-purpose machines. In addition, those of ordinary skill in the art will recognize that devices of a less general-purpose nature, such as hardwired devices, field programmable gate arrays (FOGs), application specific integrated circuits (ASICs), or the like, may also be used without departing from the scope and spirit of the inventive concepts disclosed herein.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for improving inductor current ramp down times in a DC-to-DC converter having an inductor conductively coupled to a low side transistor on a first side of the inductor and an OR-ing transistor coupled to a second side of the inductor, wherein the DC-to-DC converter is in a phase redundant power supply, the method comprising; turning off the low side transistor and turning off the OR-ing transistor in response to an unloading transient involving a reduction in current through the inductor.

2. The method of claim 1 wherein the low side transistor and OR-ing transistor are turned off within 30 nanoseconds (ns) of detection of the unloading transient.

3. The method of claim 1 wherein the inductor is de-energized through a body diode of the OR-ing transistor and a body diode of the low side transistor.

4. The method of claim 1 wherein the inductor ramp down time is less than 2.4 microseconds (µs).

5. The method of claim 1, wherein the low-side transistor and OR-ing transistor are off simultaneously for some period of time before turning the low side transistor on again.

6. The method of claim 1, wherein turning off the low side transistor and turning off the OR-ing transistor in response to an unloading transient includes responding to a pulse width modulation (PWM) turn off the low side transistor and turning off the OR-ing in response to a tri-state PWM signal.

7. A DC-to-DC converter in a phase redundant power supply comprising:
   an inductor;
   a low side transistor conductively coupled to a first side of the inductor;
   an OR-ing transistor conductively coupled to a second side of the inductor;
   a Phase Redundant Controller (PRC) communicatively coupled to the OR-ing transistor and wherein the controller is configured to cause the OR-ing transistor to turn off in response to an unloading transient.

8. The DC-to-DC converter of claim 7 wherein a signal received by the low side driver from a Pulse Width Modulated signal (PWM) controller is configured to cause the low side transistor to turn off in response to the unloading transient.

9. The DC-to-DC converter of claim 8, wherein the PRC and PRM are configured to keep the low-side transistor and OR-ing transistor off simultaneously for some period of time before turning the low side transistor on again.

10. The DC-to-DC converter of claim 7 wherein the low side transistor and OR-ing transistor are turned off within 30 nanoseconds (ns) of detection of the unloading transient.

11. The DC-to-DC converter of claim 7 wherein the inductor is de-energized through a body diode of the OR-ing transistor and a body diode of the low side transistor.

12. The DC-to-DC converter of claim 7 wherein the inductor ramp down time is less than 2.4 microseconds (μs).

13. The DC-to-DC converter of claim 7 further comprising;
   a high side transistor conductively coupled to the first side of the inductor;
   a capacitor having a conductive coupling to the second side of the inductor and the OR-ing transistor.

14. Non-transitory instructions embedded on a computer readable medium that, when executed by a processor, cause the processor to enact the method comprising:
   turning off a low side transistor and turning off a OR-ing transistor in response to an unloading transient involving a reduction in current through the inductor.

15. The non-transitory instructions of claim 14 wherein the low side transistor and OR-ing transistor are turned off within 30 nanoseconds (ns) of detection of the unloading transient.

16. The non-transitory instructions of claim 14 wherein the inductor is de-energized through a body diode of the OR-ing transistor and a body diode of the low side transistor.

17. The non-transitory instructions of claim 14 wherein the inductor ramp down time is less than 2.4 microseconds (μs).

18. The non-transitory instructions of claim 14, wherein the instructions are configured to keep the low-side transistor and OR-ing transistor off simultaneously for some period of time before turning the low side transistor on again.

19. The non-transitory instructions of claim 14, wherein turning off the low side transistor and turning off the OR-ing transistor in response to an unloading transient includes responding to a pulse width modulation (PWM) turn off the low side transistor and turning off the OR-ing in response to a tri-state PWM signal.

* * * * *